US010057537B1

(12) United States Patent
MacDonald-King et al.

(10) Patent No.: US 10,057,537 B1
(45) Date of Patent: Aug. 21, 2018

(54) SYSTEM AND METHOD FOR SOURCE SCRIPT AND VIDEO SYNCHRONIZATION INTERFACE

(71) Applicant: PRIME FOCUS TECHNOLOGIES, INC., Culver City, CA (US)

(72) Inventors: Patrick MacDonald-King, El Segundo, CA (US); Ramki Sankaranarayan, Mumbai (IN); Amer N. Saleem, Los Angeles, CA (US); Kristopher King, Los Angeles, CA (US); Venkata R. Garikapati, Torrance, CA (US)

(73) Assignee: Prime Focus Technologies, Inc., Culver City, CA (US)

( * ) Notice: Subject to any disclaimer, the term of this patent is extended or adjusted under 35 U.S.C. 154(b) by 0 days.

(21) Appl. No.: 15/681,242

(22) Filed: Aug. 18, 2017

(51) Int. Cl.
| | |
|---|---|
| H04N 5/93 | (2006.01) |
| H04N 5/932 | (2006.01) |
| H04N 21/235 | (2011.01) |
| H04N 21/242 | (2011.01) |
| H04N 21/435 | (2011.01) |
| H04N 21/81 | (2011.01) |
| H04N 21/431 | (2011.01) |

(Continued)

(52) U.S. Cl.
CPC ........... *H04N 5/9305* (2013.01); *G11B 27/34* (2013.01); *H04N 21/2353* (2013.01); *H04N 21/242* (2013.01); *H04N 21/435* (2013.01); *H04N 21/4307* (2013.01); *H04N 21/4316* (2013.01); *H04N 21/4438* (2013.01); *H04N 21/8133* (2013.01); *H04N 21/8456* (2013.01)

(58) Field of Classification Search
CPC ............. H04N 5/9305; H04N 21/2353; H04N 21/242; H04N 21/4307; H04N 21/4316; H04N 21/435; H04N 21/4438; H04N 21/8133; H04N 21/8456; H04N 15/04; H04N 13/0296; H04N 13/0051; H04N 21/4223; G11B 27/34
USPC ................................ 386/282, 201, 210, 224
See application file for complete search history.

(56) References Cited

U.S. PATENT DOCUMENTS

| | | |
|---|---|---|
| 7,660,416 B1 | 2/2010 | Kline |
| 8,218,764 B1 | 7/2012 | Kline |

(Continued)

*Primary Examiner* — Helen Shibru
(74) *Attorney, Agent, or Firm* — Seed Intellectual Property Law Group LLP

(57) ABSTRACT

A script synchronization interface system is disclosed for synchronizing a script, shot properties, and one or more video files by mapping associated metadata. The script synchronization interface system includes an interactive script section, an interactive video section, and an interactive shot section. The interactive script section includes synchronized script dialog that is selectable by individual word. A selected word in the synchronized script dialog within the interactive script section is linked to a video frame and a combination of "shot set-up" and "take" information associated with the selected word in the script dialog. The interactive video section includes a video player that plays a synchronized video. The synchronized video in the interactive video section is linked to synchronized script dialog in the interactive script section and a combination of "shot set-up" and "take" information associated with the selected word in the script dialog. The interactive shot section includes selectable vertical line segments, on-screen actor information, shot set-up information, and take numbers.

37 Claims, 10 Drawing Sheets

(51) Int. Cl.
  *H04N 21/43*    (2011.01)
  *H04N 21/443*   (2011.01)
  *G11B 27/34*    (2006.01)
  *H04N 21/845*   (2011.01)

(56) References Cited

U.S. PATENT DOCUMENTS

| | | |
|---|---|---|
| 9,215,514 B1 | 12/2015 | Kline |
| 9,448,696 B1 | 9/2016 | Kline |
| 2008/0010601 A1* | 1/2008 | Dachs .................... G06Q 10/10 715/751 |
| 2009/0259623 A1* | 10/2009 | Mooneyham ..... G06F 17/30038 |
| 2012/0236201 A1* | 9/2012 | Larsen ................... G06Q 10/10 348/468 |
| 2013/0124979 A1* | 5/2013 | Chang ................... G06F 17/218 715/243 |
| 2013/0124984 A1* | 5/2013 | Kuspa .................... H04N 9/475 715/255 |
| 2016/0029106 A1* | 1/2016 | Chen ................ G06F 17/30837 386/282 |

* cited by examiner

SCENE AND TAKE MANAGER

| Name | Scene | Take | CamRoll | |
|---|---|---|---|---|
| 7A/1 | 7A | 1 | A011C001 | ☒ |
| 7A/2 | 7A | 2 | B012C001 | ☒ |
| 7A/3 | 7A | 3 | A011C002 | ☒ |
| 7A/4 | 7A | 4 | B012C002 | ☒ |
| 7B/1 | 7B | 1 | A011C003 | ☒ |
| 7B/2 | 7B | 2 | B012C003 | ☒ |
| 7B/3 | 7B | 3 | A011C004 | ☒ |
| 7C/1 | 7C | 1 | B012C004 | ☒ |
| 7C/2 | 7C | 2 | A011C005 | ☒ |

[ Include ] [ Exclude ]
[ On-Camera ] [ Off-Camera ]
Shot Description [_____]
[ Cancel ] [ Save ]

EG243242_2k.mov
2 Months ago

SCRIPT LINING TOOL

| | 7A | 1 | A011C001 | ☒ |
|---|---|---|---|---|
| 7A/2 | 7A | 2 | A011C001 | ☒ |
| 7A/3 | 7A | 3 | A011C002 | ☒ |

JOHNSON (CONT'D)
You should just date somebody who is good to you.
LEETA
You know what, he's frank. He told me we just having fun. And I am okay with that!
JOHNSON
He also told you to see an eye doctor. He's mean!
LEETA
Leeta has dirt on her face.
LEETA
I don't need an eye doctor.
JOHNSON
You're right.
LEETA
There's nothing wrong with my eyes. Johnson has dirt on her face too.
JOHNSON
You're very nice. Will you date me?
LEETA
Yes.
JOHNSON
I like you.
LEETA
I like you.

FIG. 6

SCENE AND TAKE MANAGER

| Name | Scene | Take | CamRoll | |
|------|-------|------|---------|---|
| 7A/1 | 7A | 1 | A011C001 | ☑ |
| 7A/2 | 7A | 2 | B012C001 | ☑ |
| 7A/3 | 7A | 3 | A011C002 | ☑ |
| 7A/4 | 7A | 4 | B012C002 | ☑ |
| 7B/1 | 7B | 1 | A011C003 | ☑ |
| 7B/2 | 7B | 2 | B012C003 | ☑ |
| 7B/3 | 7B | 3 | A011C004 | ☑ |
| 7C/1 | 7C | 1 | B012C004 | ☑ |
| 7C/2 | 7C | 2 | A011C005 | ☑ |

[ Include ] [ Exclude ]
[ On-Camera ] [ Off-Camera ]

Shot Description
[                    ]

[ Cancel ] [ Save ]

EG243242_2k.mov
2 Months ago

SCRIPT LINING TOOL

JOHNSON (CONT'D)
You should just date
somebody who is good to you.
LEETA
You know what, he's frank. He told
me we just having fun. And I am okay with that!
JOHNSON
He also told you to see an eye
doctor. He's mean!
LEETA
Leeta has dirt on her face.
JOHNSON
I don't need an eye doctor.
LEETA
You're right.
JOHNSON
There's nothing wrong with my eyes.
LEETA
Johnson has dirt on her face too.
JOHNSON
You're very nice. Will you date me?
LEETA
Yes.
JOHNSON
I like you.
LEETA
I like you.

(7A)

Information ▶

FIG. 7

SCENE AND TAKE MANAGER

| Name | Scene | Take | CamRoll | |
|---|---|---|---|---|
| 7A/1 | 7A | 1 | A011C001 | ☒ |
| 7A/2 | 7A | 2 | B012C001 | ☒ |
| 7A/3 | 7A | 3 | A011C002 | ☒ |
| 7A/4 | 7A | 4 | B012C002 | ☒ |
| 7B/1 | 7B | 1 | A011C003 | ☒ |
| 7B/2 | 7B | 2 | B012C003 | ☒ |
| 7B/3 | 7B | 3 | A011C004 | ☒ |
| 7C/1 | 7C | 1 | B012C004 | ☒ |
| 7C/2 | 7C | 2 | A011C005 | ☒ |

Include / Exclude
On-Camera / Off-Camera
Shot Description
Cancel / Save

EG243242_2k.mov
2 Months ago

SCRIPT LINING TOOL

MCU ANNEE
7A

JOHNSON (CONT'D)
You should just date
somebody who is good to you.
LEETA
You know what, he's frank. He told
me we were just having fun. And I am okay with that!
JOHNSON
He also told you to see an eye
doctor. He's mean!
LEETA
Leela has dirt on her face.
LEETA
I don't need an eye doctor.
JOHNSON
You're right.
LEETA
There's nothing wrong with my eyes.
Johnson has dirt on her face too.
JOHNSON
You're very nice. Will you date me?
LEETA
Yes.
JOHNSON
I like you.
LEETA
I like you.

FIG. 9

SYSTEM AND METHOD FOR SOURCE SCRIPT AND VIDEO SYNCHRONIZATION INTERFACE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to a system and method for synchronizing a source Script and video files and, more particularly, to a system and method for providing a Synchronization Interface for viewing and interacting with synchronized Script and production video files.

BACKGROUND

The creation of filmed content involves numerous steps, including (1) the development of a screenplay, (2) pre-production, (3) shoot preparation, (4) filming, (5) editing, (6) post production, and (7) downstream actions (e.g., marketing tasks). During the various production steps (e.g., active development, pre-production, production/filming, and post-production), many advanced technology tools are available to technicians to both collaborate and perform tasks associated with each process.

The earliest stages of a filmed content project include screenplay development. The screenplay, which is defined as the project's written form, including visual descriptions, acting dialogue and instructions, is typically created by a screenwriter for films, television shows, digital shows, shorts, and many other forms of filmed entertainment. The process for writing, editing, re-writing, and collaborating on a screenplay is managed using a variety of electronic, online, and analog tools and processes. While a screenplay may include varying formats, it is generally broken up into "scenes," each of which are comprised of a unique location that is specified in the scene description.

A project may not have a finalized screenplay when it begins production, but usually the screenplay is complete. However, in some scenarios, changes are made to scripts frequently on a set. When preparation begins for filming/production, this preparation includes the creation of a shot list. The shot list breaks each scene in the screenplay down into its coverage (i.e., the shots required to film the scene). Each shot typically references the associated scene, camera setup/angle, type of lens used, actors on screen, and the like, so that enough criteria is documented to assist in planning the shoot during pre-production.

The video footage that is shot during production is converted from the original footage stored on camera cards into multiple digital versions for future/downstream functions. These future/downstream functions include (1) previewing the daily footage ("Dailies"), (2) editorial, (3) visual effects, (4) sound editing functions, and (5) marketing requests. Currently, during the production process, the "Dailies" are delivered as digital files via online websites and mobile applications created for this express purpose. In the recent past, before transition to digital production, "Dailies" were stored on DVDs, drives, or other memory devices, which had to be manually delivered to all of the relevant parties for viewing.

Included among these multiple versions of video footage is a lower bit rate copy made for streaming full motion video over the Internet via online websites and mobile applications. This is specifically relevant for previewing the Dailies files in a collaborative manner with other technicians on the production.

Along with the video and audio material from the day, a marked-up version of the screenplay which visually overlays all the planned shots is delivered during post-production. As shown in FIG. 1, for each scene the lined Script uses vertical lines to distinguish different shots by name and length. This marked-up version of the screenplay enables the editors to assess coverage for any given moment. Additionally, the lined Script identifies which actors are on screen for any given shot via a smooth or jagged line (i.e., with the smooth line indicating that the actor is on screen and the jagged line indicating that the actor is off screen). Additional information (e.g., the best/circle take, changes in dialogue, sound and camera information, and any additional notes that could benefit the editorial team during post production) is also delivered in the form of a detailed Continuity Report.

U.S. Pat. Nos. 7,660,416; 8,218,764; 9,215,514; 9,448,696 disclose the creation, management, delivery, and display of Dailies files, as well as the collaborative interaction by users with Dailies files. The infrastructure for the management and collaborative interaction with Dailies files may include (1) a system server for receiving and storing digital media files, (2) parsing and embedding software to read data from log files that accompany the digital video files and segment the files into new digital Dailies files, and (3) a collaborative display interface that displays the Dailies files as media clips and enables users to collaboratively interact with other users in a frame specific manner.

The systems associated with this streaming function focus on the secure transfer/delivery, storage, and transmission/streaming/display of a low bit rate electronic copy of the original daily footage camera files.

Often projects use multiple applications or tools to attempt to correlate and review the Dailies with the associated information from the continuity log. Accordingly, there is continuing need for associating digital production files and information such as that contained in the continuity log.

Notably, all of the subject matter discussed in this section is not necessarily prior art and should not be assumed to be prior art merely as a result of its discussion in this section. Accordingly, any recognition of problems in the prior art discussed in this section or associated with such subject matter should not be treated as prior art unless expressly stated to be prior art. Instead, the discussion of any subject matter in this section should be treated as part of the identification of the technological problem to be overcome, which in and of itself may also be inventive.

BRIEF SUMMARY

Briefly, and in general terms, a method is disclosed for synchronizing script, shot information, and video information using a script interaction interface. The method includes: uploading production video files at a server, the production video files containing video metadata; uploading a continuity log file or digital script file at the server, the continuity log file or digital script file containing script metadata; ingesting the script metadata and the video metadata; performing a primary synchronization by using the scene number, take, and camera information in both the script metadata and the video metadata to synchronize takes in a script with takes in video; performing a secondary synchronization by aligning dialogue elements from the script metadata with audio from the production video files to create a temporal mapping of exact dialogue start points and end points; presenting a script synchronization interface on a display device that includes (1) an interactive script section, the interactive script section including synchronized script dialog that is selectable by a user by individual word, (2) an interactive video section, the interactive video section including a video player that plays videos that are synchronized with the synchronized script dialog in the interactive script section, and (3) an interactive shot section, the interactive shot section including selectable vertical line segments, on-screen actor information, shot set-up information, and take numbers; and enabling viewing of a production video file on the display device simultaneously with a synchronized script dialog and associated production time codes, scene details, on-screen actor information, camera information, shot set-up information, take number, and combinations thereof.

In one non-limiting embodiment, the continuity log file is an XML (Extensible Markup Language) data file, a JSON (JavaScript Object Notation) data file, or any other sidecar metadata file. Sidecar metadata files are computer files that store data, such as metadata, which is not supported by the format of a source file. In another aspect of one embodiment, digital instructions in the continuity log file are used to create a full synchronized script within the interactive script section of the script synchronization interface. In still another aspect of one embodiment, the digital instructions in the continuity log file are used to create standard elements and shot properties within the interactive shot section of the script synchronization interface, wherein the standard elements include scene numbers, scene headings, scene description, character names, and combinations thereof, and wherein the shot properties include shot number, slate, take, shot length, actors on screen, production timecode information identifying temporal placement of material within master footage, and combinations thereof. This creation of standard elements and shot properties within the interactive shot section of the script synchronization interface may be performed automatically in some embodiments and may be performed manually in other embodiments.

In another embodiment, the script synchronization interface further includes a video file list section, wherein selecting a video file from the video file list section launches the synchronized video in the interactive video section, displays synchronized script dialog in the interactive script section, and displays associated vertical line segments, scene details, on-screen actor information, camera information, shot set-up information, and take number in the interactive shot section. In another aspect of at least one embodiment, the method further includes contextualizing video files by enabling a user to search video files by actor, type of shot, camera set-up, or line of dialog. In still another aspect of at least one embodiment, the method further includes transforming the synchronized script dialog into a navigation tool for the video files.

In yet another embodiment, selecting a shot set-up in the interactive shot section causes the display of a pop-up window listing available takes that are associated with the selected shot set-up. In another aspect of one embodiment, selecting a take from the pop-up window of available takes in the interactive shot section causes the launch of a corresponding synchronized video in the interactive video section. In still another aspect of one embodiment, selecting a word in the synchronized script dialog within the interactive script section causes the display of a pop-up window listing available shot set-ups and takes that are associated with the available shot set-ups and corresponding word in the synchronized script dialog. In yet another aspect of one embodiment, selecting a take from the pop-up window of available shot set-ups and takes in the interactive script section causes the launch of the synchronized video in the interactive video section. In some embodiments, selecting a word in the synchronized script dialog within the interactive script section, results in a synchronized video displayed within the interactive Video Feed section navigating to a corresponding location in the synchronized video. In another aspect of some embodiments, selecting a point on a shot vertical line segment within the interactive script section that corresponds to a specific production timecode, results in the synchronized video displayed within the interactive Video Feed section navigating to a specific production timecode location in the synchronized video.

In one aspect of some embodiments, as a synchronized video plays in the interactive video section, a corresponding section of synchronized script dialog within the interactive script section is highlighted to enable a user to follow along in the synchronized script dialog as the synchronized video plays in the interactive video section. In another aspect of some embodiments, as the synchronized video plays in the interactive video section, a navigation bar associated with the synchronized video is selectable to navigate to a production timecode location in the synchronized video, with results in highlighting a corresponding location in the synchronized script dialog within the interactive script section. In still another aspect of some embodiments, temporal mapping is performed between a script text file and corresponding timecodes of the video files by building relationships between script text metadata and metadata of the video files and their associated audio information.

Additionally, another method is disclosed for synchronizing script, shot information, and video information using a script interaction interface. This method includes: accessing production video files at a server, the production video files containing video metadata; accessing a continuity log file or digital script file at the server, the continuity log file or digital script file containing script metadata instructions for generating a digital source script; performing synchronization of the digital source script with the production video files by using the scene number, take, and camera information in both the script metadata and the video metadata to synchronize takes in the digital source script with takes in the production video files, as well as align dialogue elements from the script metadata with audio from the production video files to create a temporal mapping of exact dialogue start points and end points; presenting a script synchronization interface on a display device that includes (1) an interactive script section, the interactive script section including synchronized script dialog that is selectable by a user by individual word, (2) an interactive video section, the interactive video section including a video player that plays videos that are synchronized with the synchronized script dialog in the interactive script section, and (3) an interactive shot section, the interactive shot section including selectable vertical line segments, on-screen actor information, shot set-up information, and take numbers; and enabling viewing of a production video file on the display device simultaneously with a synchronized script dialog and associated production time codes, scene details, on-screen actor information, camera information, shot set-up information, take number, and combinations thereof.

In another embodiment, a script synchronization interface system is disclosed for synchronizing a script, shot properties, and one or more video files by mapping associated metadata. The script synchronization interface system comprising: one or more processors; a display device, and a memory device storing a set of instructions that when executed by the one or more processors, causes the one or more processors to: access a digital source script that has been synchronized with production video files by using scene number, take, and camera information in both script metadata and video metadata to synchronize takes in the digital source script with takes in the production video files, as well as align dialogue elements from the script metadata with audio from the production video files to create a temporal mapping of exact dialogue start points and end points; present an interactive script section on the display device that includes synchronized script dialog that is selectable by individual word, wherein a selected word in the synchronized script dialog within the interactive script section is linked to a video frame and a combination of shot set-up and take information associated with the selected word in the script dialog; present an interactive video section on the display device that includes a video player that plays a synchronized video, wherein the synchronized video in the interactive video section is linked to synchronized script dialog in the interactive script section and a combination of shot set-up and take information associated with the selected word in the script dialog; and present an interactive shot section on the display device that includes selectable vertical line segments, scene details, on-screen actor information, camera information, shot set-up information, and take numbers; wherein the meta-data used to associate the script with the video files includes production time codes, scene details, on-screen actor information, camera information, shot set-up information, take number, and combinations thereof.

In another embodiment, a script synchronization interface system is disclosed for synchronizing a script, shot properties, and one or more video files by mapping associated metadata. The script synchronization interface system includes: accessing a digital source script that has been synchronized with production video files by using scene number, take, and camera information in both script metadata and video metadata to synchronize takes in the digital source script with takes in the production video files, as well as align dialogue elements from the script metadata with audio from the production video files to create a temporal mapping of exact dialogue start points and end points; presenting an interactive script section on a display device that includes synchronized script dialog that is selectable by individual word, wherein a selected word in the synchronized script dialog within the interactive script section is linked to a video frame and a combination of shot set-up and take information associated with the selected word in the script dialog; presenting an interactive video section on the display device that includes a video player that plays a synchronized video, wherein the synchronized video in the interactive video section is linked to synchronized script dialog in the interactive script section and a combination of shot set-up and take information associated with the selected word in the script dialog; and presenting an interactive shot section on the display device that includes selectable vertical line segments, on-screen actor information, shot set-up information, and take numbers.

These features with other technological improvements, which will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

FIG. 6 illustrates an embodiment of the Script Synchronization Interface in which takes are being selected and dragged from the scene and take manager to the script using a script lining tool of the synchronization system;

FIG. 7 illustrates an embodiment of the Script Synchronization Interface of FIG. 6 in which a user drags the shot line to the shot line end point, which represents the duration of the shot;

FIG. 9 illustrates an embodiment of the Script Synchronization Interface of FIG. 6 in which a user completes the shot properties by entering a shot description (i.e. "MCU ANNIE" where MCU stands for Medium Close Up) and saves the changes.

DETAILED DESCRIPTION

Figure 1:
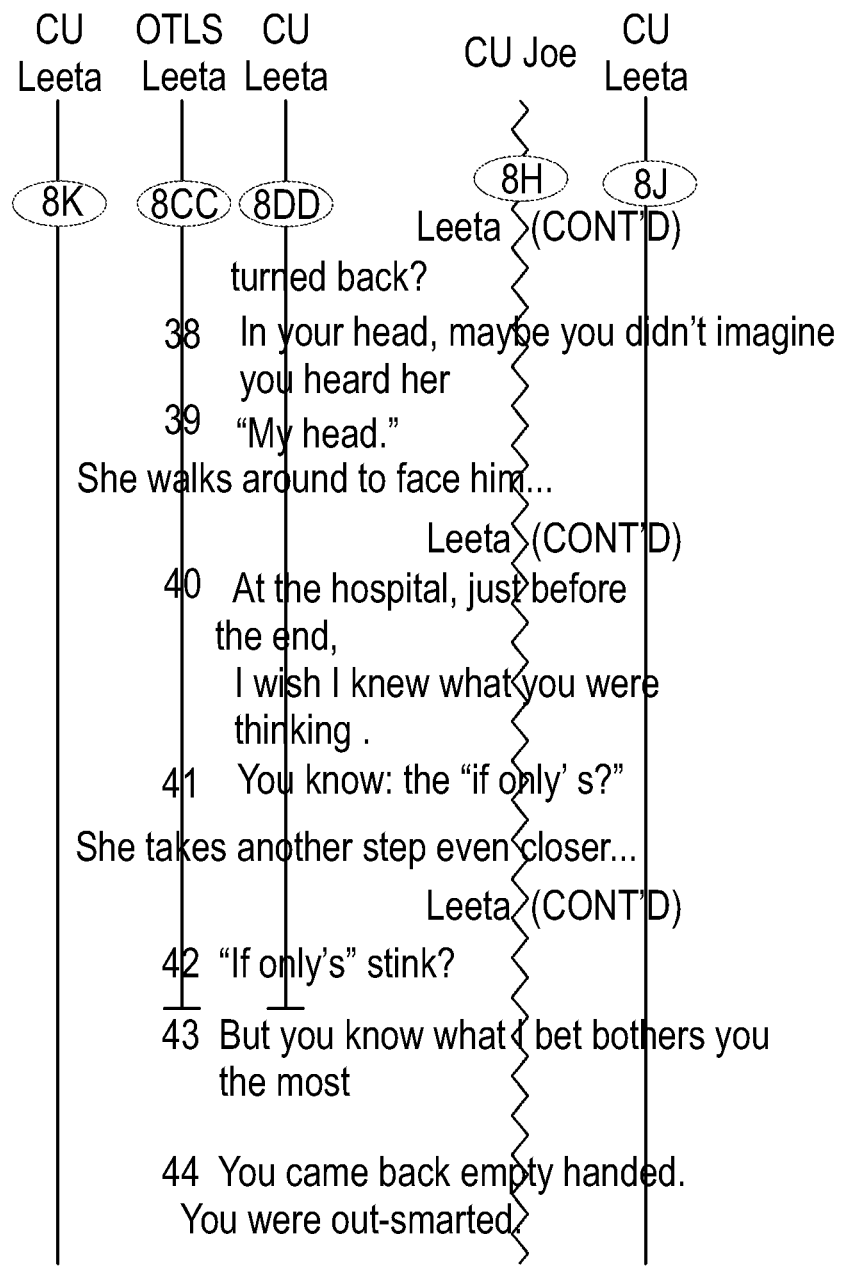
FIG. 1 illustrates an example of a lined Script.

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide a system and method for synchronizing a source script and video files, as well as providing a Synchronization Interface for viewing and interacting with synchronized script and production video files. Representative examples utilizing many of these additional features and teachings, both separately and in combination, are described in further detail with reference to attached FIGS. 1-9. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD ROMs, and magnetic optical disks, read only memories (ROMs), random access memories (RAMs), EPROMs, EEPROMs, magnetic or optical cards, or any type of media suitable for storing electronic instructions, and each coupled to a computer system bus.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

An embodiment is shown of the system and method for synchronizing a source script and production video files, as well as providing a Synchronization Interface for viewing and interacting with synchronized script and production video files. Referring now to the drawings, wherein like reference numerals denote like or corresponding parts throughout the drawings, and more particularly to FIGS. 2-5, there is shown a Script Synchronization Interface 100.

The System and Method of Script and Video Synchronization maps individual takes or video files in the Dailies with the continuity log information and the script. This information is captured together and displayed in a single application. The System and Method of Script and Video Synchronization enables both on-set technicians and the Production Studio to review the Dailies and correlate the video files with the continuity log information captured on-set. Specifically, the System and Method of Script and Video Synchronization enables a user to contextualize Dailies. In this regard, instead of relying on a sterile, tedious, codified number system to organize Dailies video files, the System and Method of Script and Video Synchronization presents a Script Synchronization Interface that enables a user to search by a particular actor, type of shot, camera set-up, line of dialog, and the like. Essentially, the System and Method of Script and Video Synchronization transforms the script into a navigation tool for the Dailies video files that enables a user to watch what characters/actors they want to see and how they want to see those characters/actors.

Figure 2:
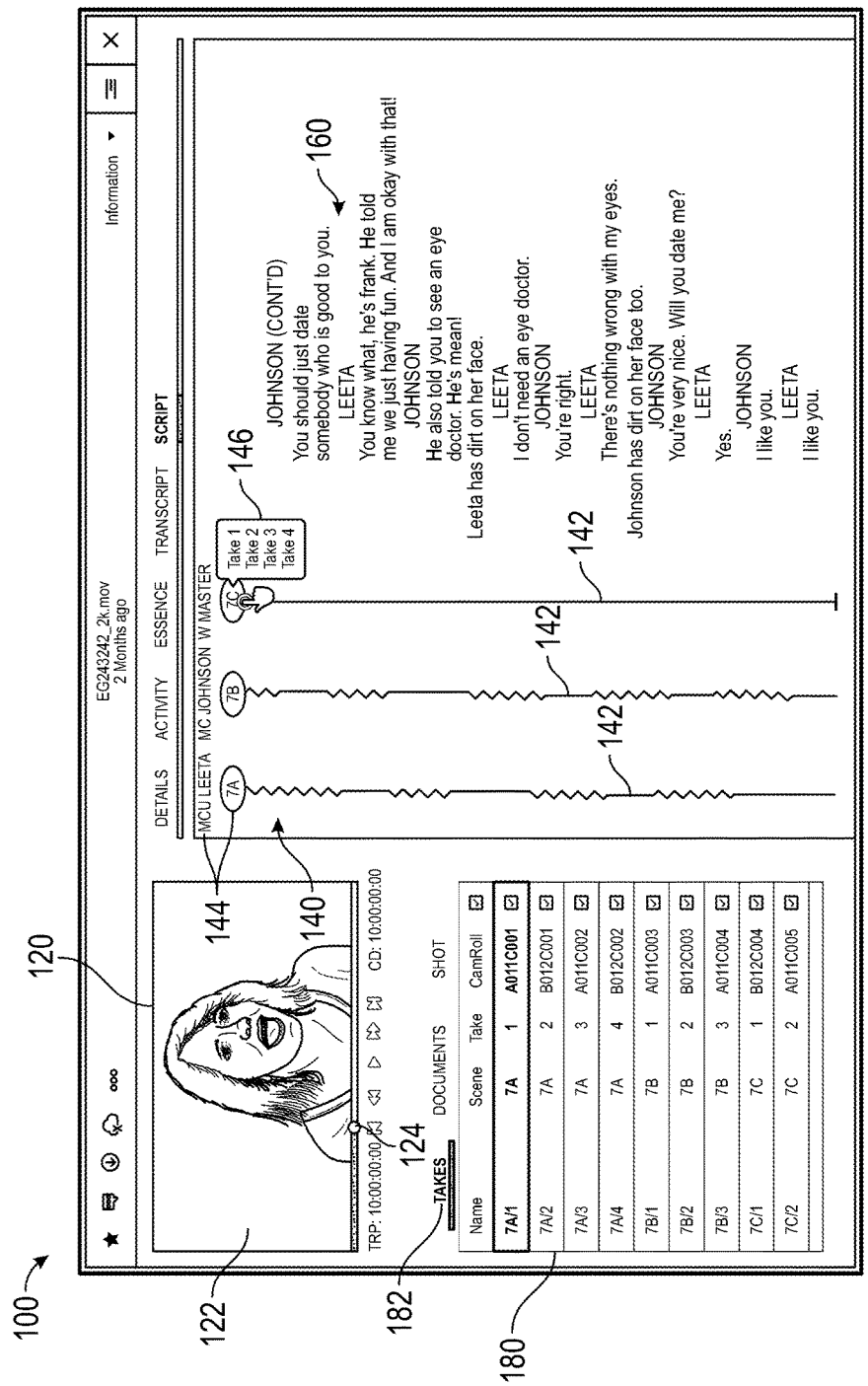
FIG. 2 illustrates a Script Synchronization Interface with an interactive Video Feed section, interactive shot section with verticals, an interactive Script section, and a video file list section, in which a user has selected a shot bubble in the interactive shot section to display a pop-up window listing available Takes 1-4 that are associated with the selected shot bubble.

FIG. 2 illustrates a Script Synchronization Interface 100 with an interactive Video Feed section 120, an interactive shot section 140 with vertical duration lines 142, an interactive script section 160, and a video file list section 180. In this implementation of the Script Synchronization Interface 100, a user has selected a shot set-up 144 (shown with a bubble) in the interactive shot section 140 to display a pop-up window 146 listing available Takes 1-4 that are associated with the selected shot set-up 144. The video file list section 180 includes a selectable takes window 182, documents window, and shot window 186.

The System and Method of Script and Video Synchronization maps and cross-references selected files in the production's camera files and source material. The temporal mapping between the script text files and the corresponding timecode of the Dailies video files is leveraged by building relationships between the script's text metadata and the video's audio and metadata. This enables the System and Method of Script and Video Synchronization to link and associate matching script and video files, thus creating the synchronization of the script and continuity log information with the Dailies video files. The script, continuity log, and technical metadata for camera are included in this information to be synchronized. This information is already being generated to hand off to Avid/FCP for editorial purposes. As such, the System and Method of Script and Video Synchronization is able to utilize existing script, continuity log, and technical metadata information to synchronize the script and continuity log information with the Dailies video files.

Figure 3A:
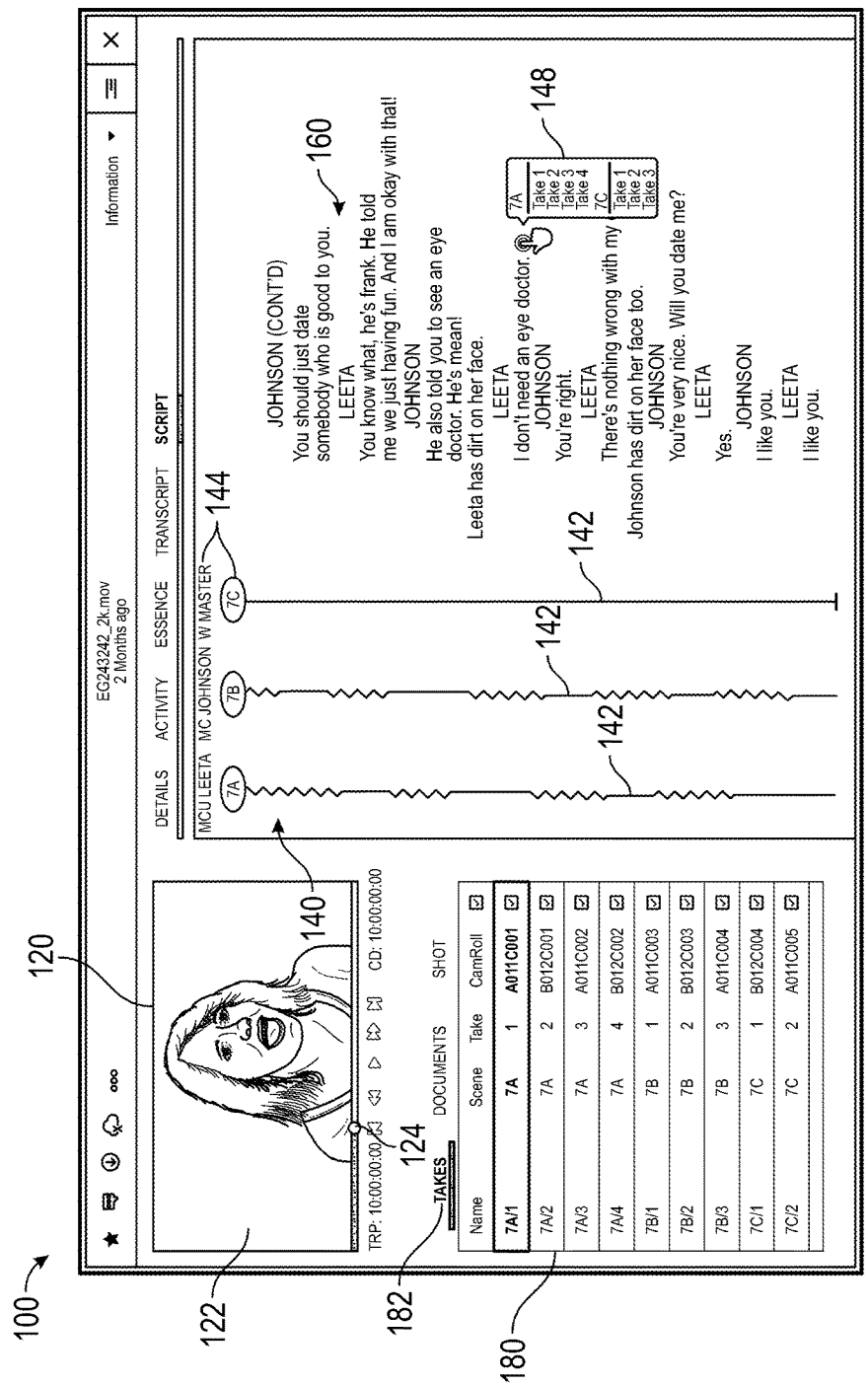
FIG. 3A illustrates an embodiment of the Script Synchronization Interface of FIG. 2 in which a user has selected a word of dialog in the interactive script section to display a pop-up window listing available shot set-ups (7A and 7C) and Takes (1-4 for 7A and 1-3 for 7C) that are associated with the selected word of dialog.

As shown in FIG. 3A, when a user of the System and Method of Script and Video Synchronization selects a word or line of dialogue from the script in the interactive script section 160, the system navigates to that point in any associated videos 122 in the interactive Video Feed section 120 and any associated takes in the interactive shot section 140. FIG. 3A illustrates the Script Synchronization Interface 100 and shows a user selecting a word of dialog 148 in the interactive script section 160 to display a pop-up window listing available shot set-ups (7A and 7C) and Takes (1-4 for 7A and 1-3 for 7C) that are associated with the selected word of dialog 148. The video file list section 180 displays the selectable takes window 182.

Figure 3B:
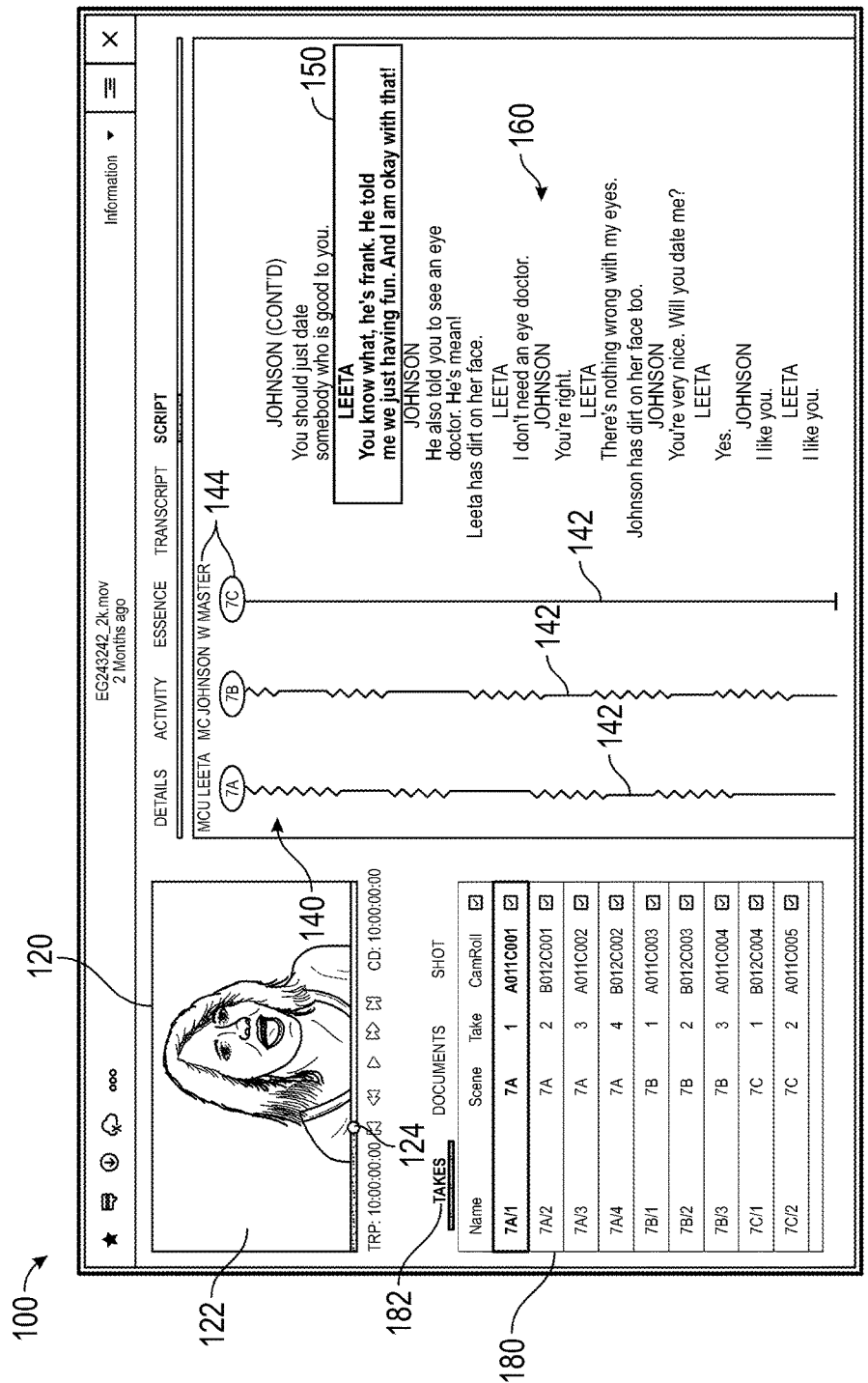
FIG. 3B illustrates an embodiment of the Script Synchronization Interface of FIG. 2 that enables a user to watch a video on the interactive Video Feed section, and have the corresponding section of dialog in the interactive script section be highlighted to enable the user to follow along in the script as the video plays in the interactive Video Feed section.

As shown in FIG. 3B, in another aspect of the System and Method of Script and Video Synchronization, when a user watches a video 122 on the interactive Video Feed section 120, the corresponding section of dialog in the interactive script section 160 is highlighted to enable the user to follow along in the script as the video 122 plays in the interactive Video Feed section 120. In still another aspect of the System and Method of Script and Video Synchronization, a user that is viewing a Dailies video file may use a navigation bar 124 at the bottom of the video 122 to navigate to a specific point (production timecode) in the video 122, causing the Script Synchronization Interface 100 to highlight the corresponding location in the script within the interactive script section 160.

As such, the System and Method of Script and Video Synchronization enables the Dailies video files to become contextualized. Specifically, the System and Method of Script and Video Synchronization transforms the Dailies video files from being dependent on a simple codified number system to being able to leverage far more valuable information about associated data, actors, type of shots, and the like. In this manner, the System and Method of Script and Video Synchronization transforms the script into a powerful navigation tool for Dailies video files.

For example, the System and Method of Script and Video Synchronization enables users to be able to search within the asset library for particular scenes and takes based on creative and/or technical metadata. Specifically, the System and Method of Script and Video Synchronization enables a user to search for all of the scenes that include a particular actor/actress and a particular type of shot (e.g., all Medium Close Up shots with Annie). An example of a Boolean search string used in the System and Method of Script and Video Synchronization for such an operation is as follows:

ShotDescription=MCU AND Character=Annie

Figure 4:
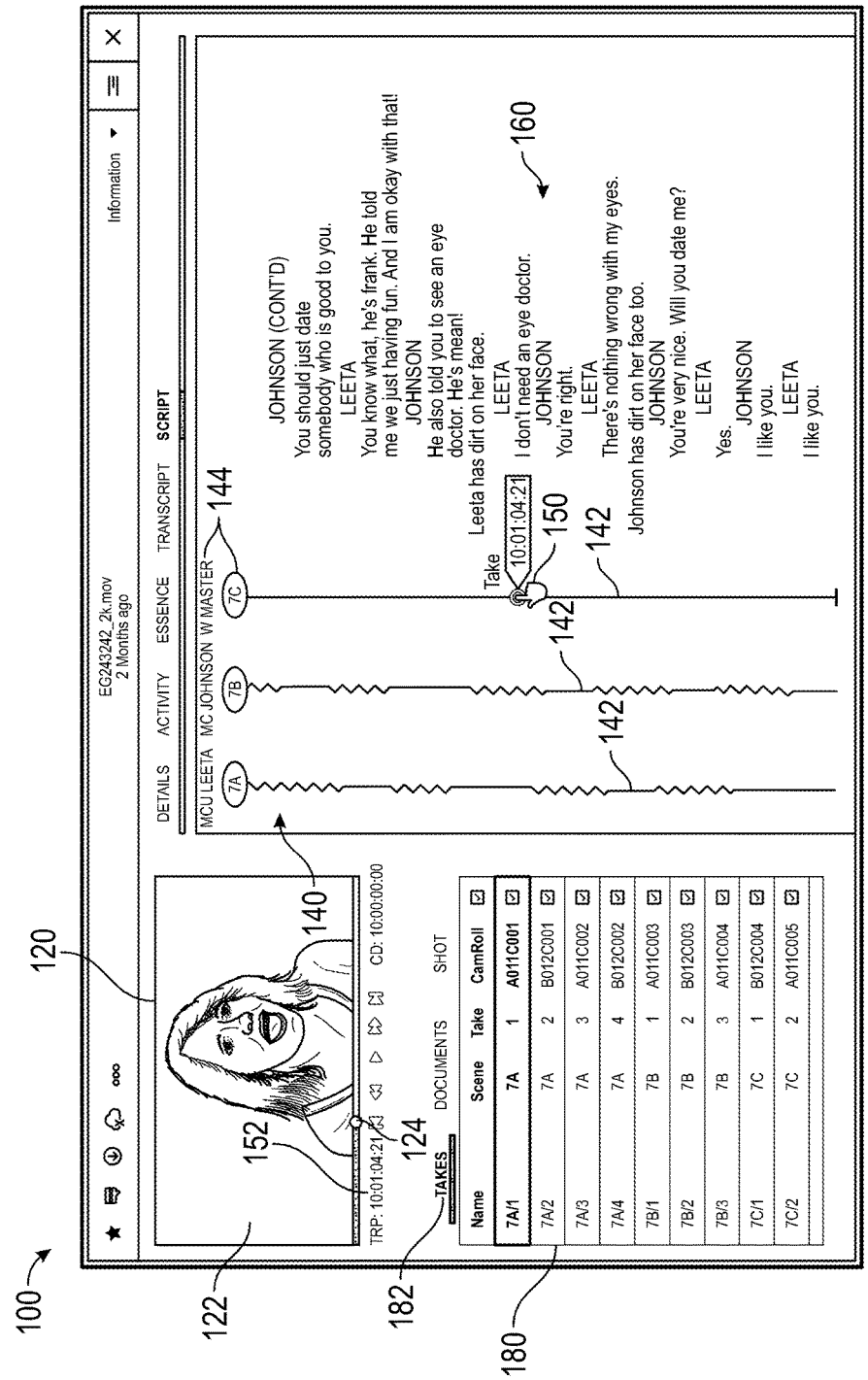
FIG. 4 illustrates an embodiment of the Script Synchronization Interface of FIG. 2 in which a user has a vertical line of Take 1 for shot set-up 7C which results in the display of timecode 10:01:04:21 on the vertical line and the interactive Video Feed section advancing the associate video file to timecode 10:01:04:21.

Referring now to FIG. 4, in yet another aspect of the System and Method of Script and Video Synchronization, the system enables a user to select a point 150 on the vertical duration line 142 of a take in the interactive shot section 140 (at a specific production timecode) and jump to a point in the video 122 within the interactive Video Feed section 120 (at a corresponding specific production timecode 152). FIG. 4 illustrates the Script Synchronization Interface 100 and shows a user selecting the point 150 on the vertical duration line 142 of Take 1 for shot set-up 7C, which results in the display of timecode 10:01:04:21 on the vertical line in the interactive shot section 140, and also results in the video 122 within the interactive Video Feed section 120 advancing the associate video 122 to timecode 10:01:04:21. Again, the video file list section 180 displays the selectable takes window 182.

The System and Method of Script and Video Synchronization accomplishes the synchronization of the source script with the Dailies video files by uploading and ingesting the source script and associated metadata to the system. After being uploaded and ingested, words of the source script are indexed so that it is searchable. The source script may be uploaded either as a stand-alone digital file or as part of the continuity log file. A continuity log file includes the necessary information to track both the continuity of the script and the general quality of the shots. The continuity may include all the details required to recreate a particular scene, location, or action, including the duration of the take, the action of the take, position of the actor, screen direction of movement, actions performed during the shot, type of lens, and the like. In one embodiment, the user navigates to the appropriate project folder to upload either the continuity log file or a stand-alone digital file in the System and Method of Script and Video Synchronization.

Figure 5:
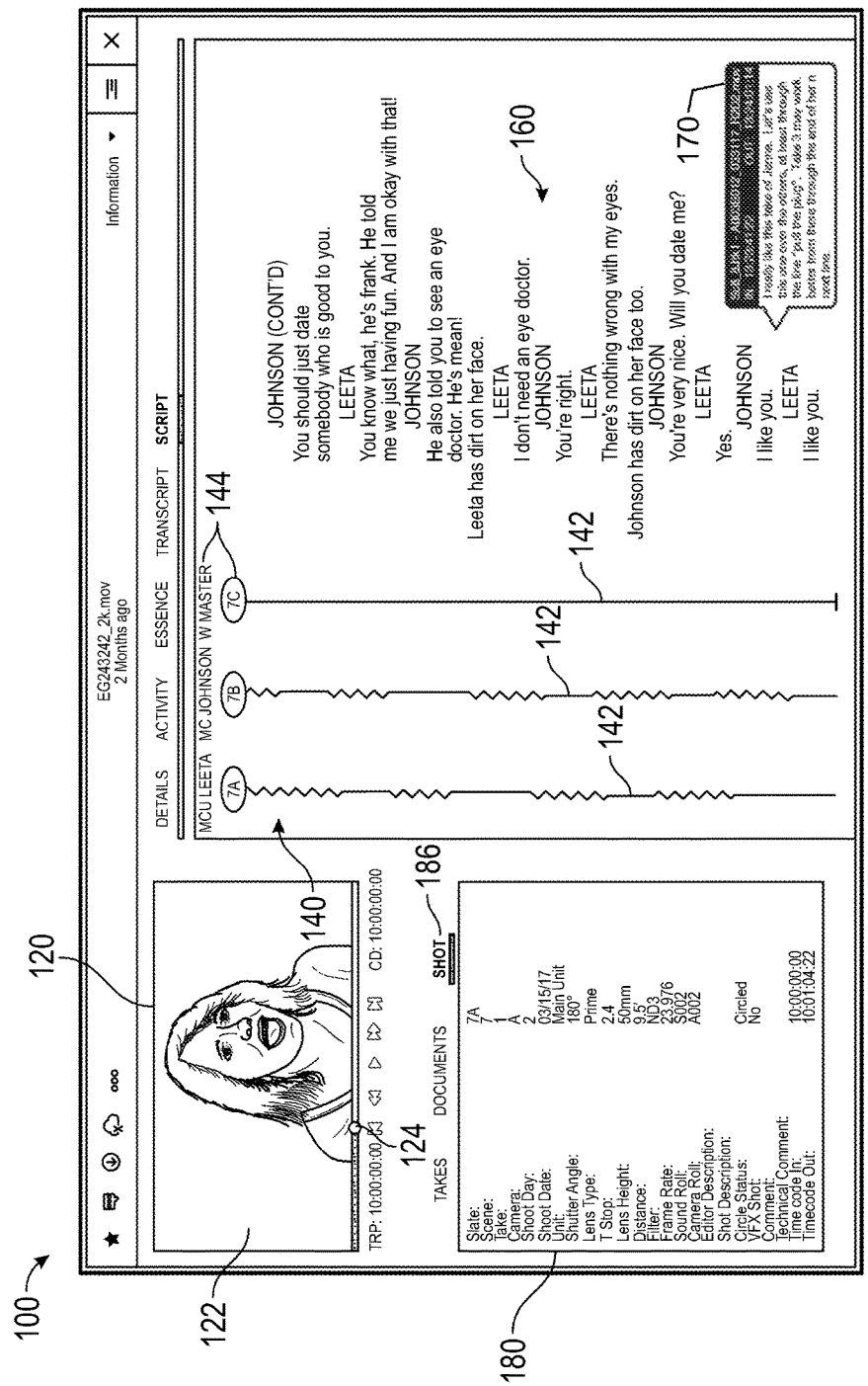
FIG. 5 illustrates an embodiment of the Script Synchronization Interface of FIG. 2 wherein, upon completion of the script ingestion, the system refreshes the script content and all of the ingested metadata elements which are viewable in the shot window of the video file list section on the Script Synchronization Interface.

A digital continuity log file, either as an XML (Extensible Markup Language) data file or JSON (JavaScript Object Notation) data file, may be uploaded by a user with the Dailies video files into the System and Method of Script and Video Synchronization. Using a standard Mac or Windows upload wizard, the user may select the continuity log file from their computer. Once selected, the System and Method of Script and Video Synchronization ingests the continuity log file and uses the digital instructions in the continuity log file to create the full script within the Script Synchronization Interface 100 with all standard elements (e.g., scene numbers, scene headings, scene description, character names, dialogue, and the like), specified shot listings and associated properties (shot number, slate, take, shot length, actors on screen, and timecode information identifying the material's temporal placement within the master footage), and any additional metadata details such as circle take, shot type, unit, and the like. As shown in FIG. 5, upon completion of the ingestion and script creation, the Script Synchronization Interface 100 refreshes with all of the script content and metadata elements presented as overlaid graphics. This information is viewable by selecting the shot window of the video file list section 180.

The following is an example of XML metadata that may be uploaded by the System and Method of Script and Video Synchronization. The following sample XML metadata is generated by a script continuity application, produced by ScriptE Systems, LLC located in Succasunna, N.J.:

```
<ShotProperties>
    <Slate>2A</Slate>
    <Scene>2</Scene>
    <Take>1</Take>
    <Camera>B</Camera>
    . . .
    <ShootDay>1</ShootDay>
    <ShootDate>2017-01-15</ShootDate>
    <Unit>Main Unit</Unit>
    <ShutterAngle></ShutterAngle>
    <LensType></LensType>
    <TStop></TStop>
    <LensHeight></LensHeight>
    <Distance></Distance>
    <Filter></Filter>
```

```xml
<FrameRate></FrameRate>
<SoundRoll></SoundRoll>
<CameraRoll>(null)</CameraRoll>
<EditorDeseription></EditorDescription>
<ShotDescription></ShotDeseription>
<CircleStatus>Active</CircleStatus>
<CompleteShot>N</CompleteShot>
<VFXShot>N</VFXShot>
<SelectType></SelectType>
<CommentsComments>
<StartDateTime></StartDateTime>
<EndDateTime></EndDateTime>
<TimeCodeIn></TimeCodeIn>
<TimeCodeOut></TimeCodeOut>
<Setup>2</Setup>
</ShotProperties>
<SceneBreakdown>
  <Scenes id="1">
    <ScriptItem>
      <Item_id>1</Item_id>
      <Page>1</Page>
      <Element_id>1</Element_id>
      <Character></Character>
      <Texts>
        <Text_type>2</Text_type>
        <Text>INT. ELECTRONICS STORE - DAY</Text>
      </Texts>
    </ScriptItem>
    <ScriptItem>
      <Item_id>2</Item_id>
      <Page>1</Page>
      <Element_id>4</Element_id>
      <Character>BOB</Character>
      <Texts>
        <Text_type>2</Text_type>
        <Text>This is just about the best store ever.</Text>
      </Texts>
    </ScriptItem>
  </Scenes>
</SceneBreakdown>
```

Separately, when a user uploads their Dailies video files into the System and Method of Script and Video Synchronization, a new step is introduced to automatically transcribe the associated audio via voice recognition of each Dailies video file. This transcription of the associated audio includes timecode identification for all dialogue. The transcription is created as an XML file that specifies all dialogue with respective starting timecode and ending timecode. The transcription file is appended to each Dailies clip/take as an essence file. Additionally, each transcription is assigned an accuracy score, based on the cleanliness of the transcribed dialogue. The following is an example of the transcription XML:

```xml
<Shot_Transcription>
  <Scene>1</Scene>
  <Take>1</Take>
  <Camera>B</Camera>
  <ShootDate>2017-01-15</ShootDate>
  <Unit>Main Unit</Unit>
  <Transcriptions>
    <Transcription>
      1
      <Timecode_in>00:00:53:11</Timecode_in>
      <Timecode_out>00:01:02:09</Timecode_out>
      This is just about the best store ever
      99
    </Transcription>
  </Transcriptions>
</Shot_Transcription>
```
Transcription score; manual QC At this stage, after uploading both the digital continuity log and the Dailies video files, the user of the System and Method of Script and Video Synchronization has the option to request a synchronization of the script with the Dailies video files. Upon selection, the System and Method of Script and Video Synchronization opens a mapping wizard application in which the user selects one or more Dailies video files for synchronization with the script. With the script already visible in the interactive script section 160 on the right side of the Script Synchronization Interface 100, a Dailies video file opens in the interactive Video Feed section 120 on the left side of the Script Synchronization Interface 100 in a streaming video player.

The Script Synchronization Interface 100 directly references the script metadata culled from the digital continuity log file and temporally synchronizes the script metadata with the Dailies video file metadata (as well as its audio) via the transcription XML file. The upload of Dailies video files into the System and Method of Script and Video Synchronization includes an automated content recognition (ACR) step in which the core video content is identified. In other embodiments, content recognition may be performed manually to identify core video content. This includes location, people on the screen, and dialogue. Dialogue transcription is typically at 80% accuracy. This is high enough for mapping script text to dialogue, which does not require 100% identical phrasing, so long as the phrasing is close. Automated Content Recognition assists in temporally mapping of non-dialogue based script action to the script where extended sequences without dialogue would be unmappable otherwise.

This synchronization of the Script and Dailies video files is performed in two stages by the System and Method of Script and Video Synchronization. In the first stage, the System and Method of Script and Video Synchronization performs the primary synchronization by using the scene number, take, and camera information in both the script metadata and the video metadata to align precise takes. The correct script/video elements are identified broadly using the source file and timecode metadata contained within the XML or JSON file. This process identifies the correct video file and script section.

Subsequently, the System and Method of Script and Video Synchronization performs the secondary synchronization. With the exact take aligned, the secondary synchronization maps specific dialogue elements from the script metadata with timecode and dialogue text of the associated audio from the transcription XML to create a temporal mapping of exact dialogue start points and end points. Within the video file, accurate identification of all of the lines of dialogue is generated using Voice Recognition-based transcription to map the dialogue correctly to the video timeline. Audio/dialogue with a high transcription score results in a direct mapping. A lower transcription score, with imprecise dialogue is not necessarily a problem since the approximate dialogue location is more important than the audio transcription of the dialogue.

In one embodiment of the System and Method of Script and Video Synchronization, if the mapping process has already identified scene 1, take 1, camera B, then whether the transcription accurately reads, "This is just about the best store ever" or inaccurately reads, "That was not the store drawer," it still identifies the associated timecode where the line is uttered, and that is of more importance to the visual display. The user will still see the first line of dialogue and the associated line from the script highlighted. Similarly, in most embodiments of the System and Method of Script and Video Synchronization, the user will never see the transcription XML instance of the dialogue text.

Once the synchronization of the script and Dailies video files by the System and Method of Script and Video Synchronization has occurred, the Script Synchronization Interface 100 provides several technological features. With respect to one technological feature of the System and Method of Script and Video Synchronization shown in FIG. 3A, as the user selects a particular point in the temporally mapped dialogue of the script in the interactive script section 160, the system navigates to the exact corresponding point in the associated video 122 within the interactive Video Feed section 120 of the Script Synchronization Interface 100. Notably, the visual representation of the synchronization also presents a highlight of the shot, take, and dialogue of the script in the interactive script section 160.

With respect to another technological feature of the System and Method of Script and Video Synchronization shown in FIG. 3B, as the video 122 plays in the interactive Video Feed section 120 of the Script Synchronization Interface 100, the temporally mapped dialogue in the visual script presented in the interactive script section 160 is highlighted. The highlighting additionally specifies the specific shot set-up 144 and vertical duration line 142 in the interactive shot section 140, and a visual pop-up window 146 lists all of the available takes for that shot set-up 144 as well. Notably, the currently synchronized take is highlighted.

Concurrently, the exact dialogue being spoken in the video 122 of the interactive Video Feed section 120 is highlighted in the corresponding words of the script in the interactive script section 160. Accordingly, the System and Method of Script and Video Synchronization enables the user to track the exact location of the dialog in the interactive script section 160 as the video 122 plays in the interactive Video Feed section 120. Additionally, by referencing the lined shot set-ups 144 (overlays) in the interactive shot section 140, the user may easily identify which actors are on screen in the shot. In some embodiments, this shot set-up information is also displayed visually under the video player in the interactive Video Feed section 120 as live metadata.

With respect to still another technological feature of the System and Method of Script and Video Synchronization, when the user selects and navigates to a particular point in the video 122 in the interactive Video Feed section 120, the system navigates to the corresponding point in the temporally mapped dialogue in the script presented in the interactive script section 160 of the Script Synchronization Interface 100. Notably, the visual representation of the synchronization also presents a highlight of the "shot set-up" and "take" in the interactive script section 160 and, potentially, a timecode location on the vertical during line 142 in the interactive shot section 140.

In another implementation shown in FIG. 5, the System and Method of Script and Video Synchronization employ robust collaboration tools, including but not limited to placing comments 170 on a video timeline. These collaboration tools extend to Dailies assets as well. In this regard, the collaboration tools of the System and Method of Script and Video Synchronization enable personnel, such as Directors, Producers and Studio Executives, to place comments 170 on proxy streaming assets. These comments 170 on proxy streaming assets may later be exported for use by editorial services.

Additionally, the collaboration tools of the System and Method of Script and Video Synchronization enables comments that are placed on a video file (or dailies reel) to be mapped to the script. In some embodiments, comments that are referenced to corresponding script elements contain the source file, scene, take, and timecode references of the comment, along with the comment body. In another aspect of the collaboration tools, the comments 170 are exportable as a lined script document with annotations inline for use by editorial staff, in addition to being viewable in the Script Synchronization Interface 100.

In another implementation of the System and Method of Script and Video Synchronization, a script/video synchronization request may originate with the video file, provided there as an associated, fully-ingested script that is sourced from a digital continuity log file and tied to the project. In this embodiment, the user of the System and Method of Script and Video Synchronization navigates to an appropriate folder and selects a video asset (e.g., one or more Dailies video files). The user then selects a script/video synchronization action that results in the system display opening a mapping wizard application in which the user selects the script file for the script/video synchronization.

Referring now to FIG. 6, if a user of the System and Method of Script and Video Synchronization does not have a continuity log data file, the user may select the option of uploading a digital script file only. In such an embodiment, an upload wizard application is used by the system to ingest the digital script file. Upon upload, the System and Method of Script and Video Synchronization ingests the digital script file and extracts metadata from the script file. This metadata includes scene numbers and headings, scene description/stage direction, character names and their associated dialogue, and page numbers. This metadata is stored with the script file in the system for creation of shot properties and for future mapping to video files.

FIG. 6 illustrates an embodiment of the Script Synchronization Interface 100 in which takes are being selected and dragged from a scene and take manager to the interactive script section 160 using a script lining tool in the System and Method of Script and Video Synchronization. Continuing, the System and Method of Script and Video Synchronization enables the user to work within the Script Synchronization Interface 100 to create shot properties in the interactive shot section 140. In one such implementation, the System and Method of Script and Video Synchronization enables the user to reference analog shot plans and/or lined scripts and append the shot plans and/or lined scripts to the digital script file. In another such implementation, the System and Method of Script and Video Synchronization enables the user leverage tools in the Script Synchronization Interface 100 to add individual shots as visual overlays to the interactive script section 160. As shown in FIG. 6, the System and Method of Script and Video Synchronization enables the user to select appropriate takes and drag them towards the interactive script section 160 where the shot set-up 144 is created in the interactive shot section 140.

Continuing, FIG. 7 illustrates an embodiment of the Script Synchronization Interface 100 of FIG. 6, in which a user of the System and Method of Script and Video Synchronization does not have a continuity log data file, but rather uploads only a digital script file and then uses tools in the Script Synchronization Interface 100 to add shot properties as visual overlays to the interactive script section 160. Specifically, FIG. 7 illustrates an embodiment of the Script Synchronization Interface 100 in which a user drags the vertical duration line 142 of the shot to the duration line end point, which represents the duration of the shot. In one embodiment, the overlays follow the known industry format of vertical duration lines that run the length of a shot within each scene. Once the user is satisfied that the vertical duration line represents the material in the script covered by the shot, the user releases the selection device (e.g., mouse), placing the vertical duration line on the interactive shot section 140.

Figure 8:
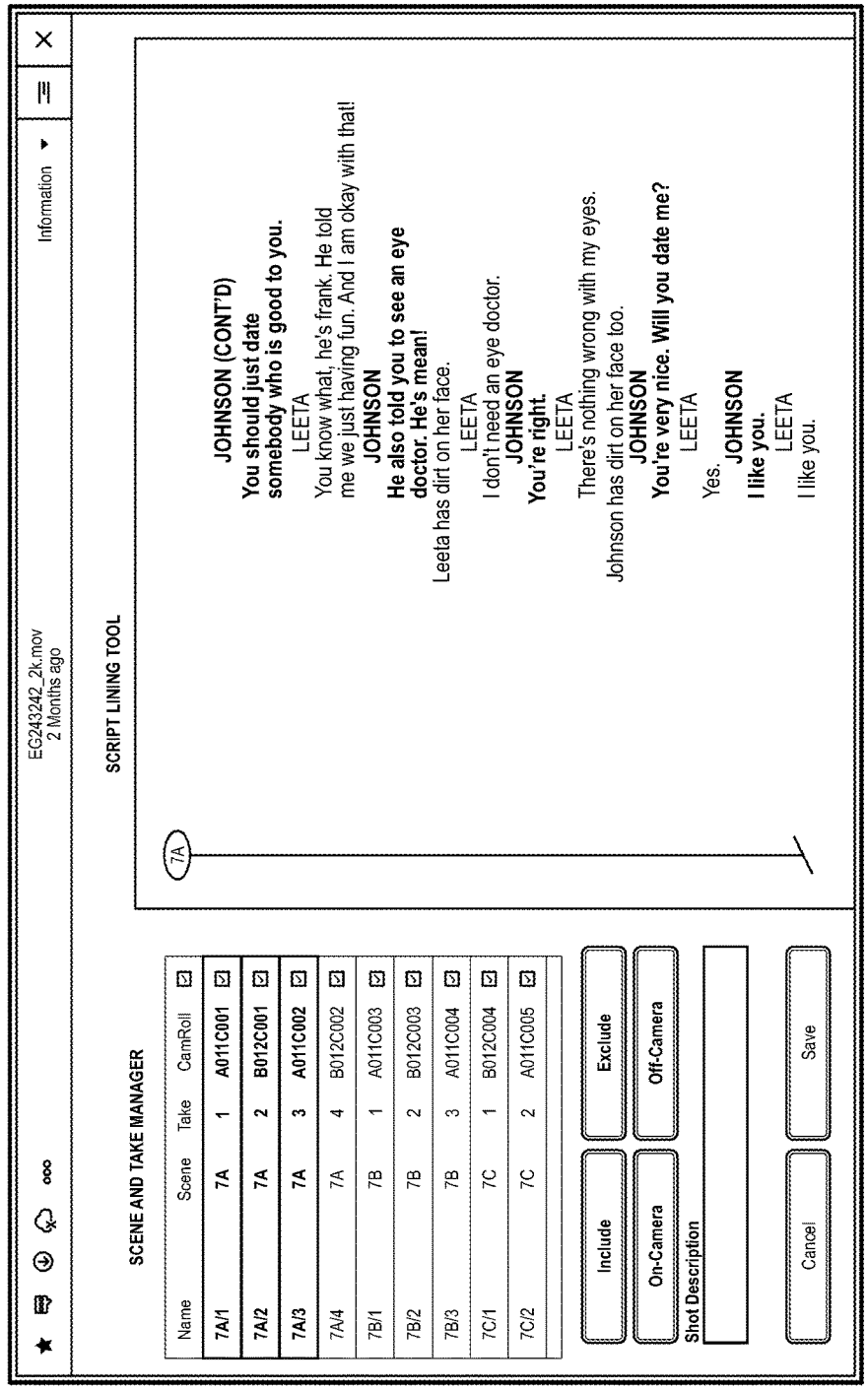
FIG. 8 illustrates an embodiment of the Script Synchronization Interface of FIG. 6 in which a user highlights any script material to be considered Off-Camera, and converts the shot line segment from a straight line to the jagged or squiggly line, wherein material on-camera is represented by a solid line and material off-camera is represented by a jagged or squiggly line.

FIG. 8 also shows an embodiment of the Script Synchronization Interface 100 in which a user of the System and Method of Script and Video Synchronization does not have a continuity log data file, but rather uploads only a digital script file. The user then employs tools in the Script Synchronization Interface 100 to build out shot properties in the interactive shot section 140. In one embodiment, the System and Method of Script and Video Synchronization presumes that all material in the script is covered by the shot. Material on camera is represented by a solid vertical duration line. The user may then employ tools in the Script Synchronization Interface 100 to highlight any script material that is Off-Camera, and convert the shot vertical duration line from a straight line to a jagged line. Typically, material Off-Camera is represented by a jagged line.

Finally, FIG. 9 again shows an embodiment of the Script Synchronization Interface 100 in which a user of the System and Method of Script and Video Synchronization does not have a continuity log data file, but rather uploads only a digital script file. The user then employs tools in the Script Synchronization Interface 100 to complete the shot properties by entering a shot description. Upon selection of all off-camera material, the user may complete the shot properties by entering a shot description (e.g., "MCU ANNIE" where MCU stands for Medium Close Up) and then save the changes. The user may also leverage the Script Synchronization Interface 100 to load a Dailies video file as reference, but follow the same manual approach to create the shot properties using tools in the Script Synchronization Interface 100.

The following is a list of major camera shot types that are used in video production. "Subject" references a person or persons or primary object of attention in the shot.

EWS—Extreme Wide Shot:
Subject of the shot is viewed from a distance. This shot is sometimes synonymous with establishing shot with focus on overall environment/locale.

MS—Master Shot:
Very similar to either the EWS or VWS. The focus is on establishing all the subjects in the shot. This shot is often used to shoot an entire scene.

VWS—Very Wide Shot:
Another type of establishing shot. The subject from afar with the focus on the environment.

WS—Wide Shot:
Subject takes up entire frame (head to toe). This shot is also known as full shot (FS).

MWS—Medium Wide Shot:
Also known as ¾ shot. This shot is half way between WS and MS. In this shot the subject is typically seen from head to knees.

MS—Medium Shot:
Top half (head to waist) of subject is in shot, allowing some detail.

MCU—Medium Close Up:
Chest-up of subject. This shot is half way between MS and CU.

CU—Close Up:
Primary feature of subject takes up the entire shot (e.g., subject's head; removes nearly all surrounding elements of environment). This shot is sometimes known as Choker shot.

ECU—Extreme Closeup:
Extreme detail of subject shown within shot/frame (e.g., eyes or nose only).

OSS—Over the Shoulder Shot:
Looking at subject from behind/over the shoulder of an opposing actor. In this shot the opposing actor's shoulder and/or head is viewable. This shot is often used in conversations between two subjects.

POV—Point of View Shot:
Approximates the exact perspective of the subject (e.g., what the subject is seeing).

Two Shot:
Two subjects appear in the shot.

In the System and Method of Script and Video Synchronization, various aspects of the systems, methods, functions, steps, features, and the like corresponding thereto may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

In some embodiments of the System and Method of Script and Video Synchronization, virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server. Additionally or alternatively, the embodiments of the System and Method of Script and Video Synchronization may execute server-based applications over a network (e.g., the Internet), locally-based "thick client" versions of the application, downloadable and installable versions of the application, or combinations thereof.

One or more embodiments of the System and Method of Script and Video Synchronization may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the System and Method of Script and Video Synchronization may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Those of ordinary skill in the art will appreciate that one or more circuits and/or software may be used to implement the System and Method of Script and Video Synchronization. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein in the System and Method of Script and Video Synchronization, the phrase "executed by a computing device" includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface that receives the data and transmits the data over a bus to a processor.

Certain words and phrases used in the System and Method of Script and Video Synchronization are set forth as follows. As used throughout this document, including the claims, the singular form "a", "an," and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases are provided throughout this patent document. Those of ordinary skill in the art will understand that in many, if not most instances, such definitions apply to prior as well as future uses of such defined words and phrases.

A processor (i.e., a processing unit), as used in the System and Method of Script and Video Synchronization, refers to one or more processing units individually, shared, or in a group, having one or more processing cores (e.g., execution units), including central processing units (CPUs), digital signal processors (DSPs), microprocessors, micro controllers, state machines, and the like that execute instructions. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts. As disclosed herein, a processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

In the System and Method of Script and Video Synchronization, memory may be used in a variety of configurations. As known by one skilled in the art, each memory comprises any combination of volatile and non-volatile, transitory and non-transitory computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, and the like. In these cases, it is understood that the different divisions of memory may be in different devices or embodied in a single memory. The memory may be configured to store data.

In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As described herein in the System and Method of Script and Video Synchronization, where a range of values is provided, it is understood that each intervening value, to the tenth of the unit of the lower limit unless the context clearly dictates otherwise, between the upper and lower limit of that range and any other stated or intervening value in that stated range, is encompassed within the invention. Also encompassed within the invention, the upper and lower limits of these smaller ranges may be independently included in the smaller ranges, subject to any specifically excluded limit in the stated range. Where the stated range includes one or both of the limits, ranges excluding either or both of those included limits are also included in the invention.

Throughout the specification, claims, and drawings of the System and Method of Script and Video Synchronization, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

What is claimed is:

1. A method for script, shot information, and video synchronization using a script interaction interface, the method comprising:
    uploading production video files at a server, the production video files containing video metadata;
    uploading a continuity log file or digital script file at the server, the continuity log file or digital script file containing script metadata;
    ingesting the script metadata and the video metadata;
    performing a primary synchronization by using the scene number, take, and camera information in both the script metadata and the video metadata to synchronize takes in a script with takes in video;
    performing a secondary synchronization by aligning dialogue elements from the script metadata with audio from the production video files to create a temporal mapping of exact dialogue start points and end points;
    presenting a script synchronization interface on a display device that includes (1) an interactive script section, the interactive script section including synchronized script dialog that is selectable by a user by individual word, (2) an interactive video section, the interactive video section including a video player that plays videos that are synchronized with the synchronized script dialog in the interactive script section, and (3) an interactive shot section, the interactive shot section including selectable vertical line segments, on-screen actor information, shot set-up information, and take numbers; and
    enabling viewing of a production video file on the display device simultaneously with a synchronized script dialog and associated production time codes, scene details, on-screen actor information, camera information, shot set-up information, take number, and combinations thereof.

2. The method of claim 1, wherein the continuity log file is an Extensible Markup Language data file, a JavaScript Object Notation data file, or another sidecar metadata file.

3. The method of claim 1, wherein digital instructions in the continuity log file are used to create a full synchronized script within the interactive script section of the script synchronization interface.

4. The method of claim 1, wherein digital instructions in the continuity log file are used to create standard elements and shot properties within the interactive shot section of the script synchronization interface, wherein the standard elements include scene numbers, scene headings, scene description, character names, and combinations thereof, and wherein the shot properties include shot number, slate, take, shot length, actors on screen, production timecode information identifying temporal placement of material within master footage, and combinations thereof.

5. The method of claim 1, wherein the script synchronization interface further includes a video file list section, wherein selecting a video file from the video file list section launches the synchronized video in the interactive video section, displays synchronized script dialog in the interactive script section, and displays associated vertical line segments, scene details, on-screen actor information, camera information, shot set-up information, and take number in the interactive shot section.

6. The method of claim 1, further comprising: contextualizing video files by enabling a user to search video files by actor, type of shot, camera set-up, or line of dialog.

7. The method of claim 1, further comprising: transforming the synchronized script dialog into a navigation tool for the video files.

8. The method of claim 1, wherein selecting a shot set-up in the interactive shot section displays a pop-up window listing available takes that are associated with the selected shot set-up.

9. The method of claim 8, wherein selecting a take from the pop-up window of available takes in the interactive shot section launches a corresponding synchronized video in the interactive video section.

10. The method of claim 1, wherein selecting a word in the synchronized script dialog within the interactive script section displays a pop-up window listing available shot set-ups and takes that are associated with the available shot set-ups and corresponding word in the synchronized script dialog.

11. The method of claim 10, wherein selecting a take from the pop-up window of available shot set-ups and takes in the interactive script section launches the synchronized video in the interactive video section.

12. The method of claim 1, wherein selecting a word in the synchronized script dialog within the interactive script section results in a synchronized video displayed within the interactive Video Feed section navigating to a corresponding location in the synchronized video.

13. The method of claim 1, wherein selecting a point on a shot vertical line segment within the interactive script section that corresponds to a specific production timecode result in the synchronized video displayed within the interactive Video Feed section navigating to a specific production timecode location in the synchronized video.

14. The method of claim 1, wherein as a synchronized video plays in the interactive video section, a corresponding section of synchronized script dialog within the interactive script section is highlighted to enable a user to follow along in the synchronized script dialog as the synchronized video plays in the interactive video section.

15. The method of claim 1, wherein as the synchronized video plays in the interactive video section, a navigation bar associated with the synchronized video is selectable to navigate to a production timecode location in the synchronized video, which results in highlighting a corresponding location in the synchronized script dialog within the interactive script section.

16. The method of claim 1, further comprising: performing temporal mapping between a script text file and corresponding timecodes of the video files by building relationships between script text metadata and metadata of the video files and their associated audio information.

17. The method of claim 1, further comprising: identifying lines of dialogue within a video file using voice recognition-based transcription to map the dialogue to a timeline with the video file.

18. The method of claim 1, further comprising: placing comments within a comments dialog box on a video timeline in the script synchronization interface.

19. The method of claim 1, further comprising: mapping comments that are placed on a video file to the script file, wherein the mapped comments are exportable as a lined script document with annotations inline.

20. A method for script, shot information, and video synchronization using a script interaction interface, the method comprising:
    accessing production video files at a server, the production video files containing video metadata;
    accessing a continuity log file or digital script file at the server, the continuity log file or digital script file containing script metadata instructions for generating a digital source script;
    performing synchronization of the digital source script with the production video files by using the scene number, take, and camera information in both the script metadata and the video metadata to synchronize takes in the digital source script with takes in the production video files, as well as align dialogue elements from the script metadata with audio from the production video files to create a temporal mapping of exact dialogue start points and end points;
    presenting a script synchronization interface on a display device that includes (1) an interactive script section, the interactive script section including synchronized script dialog that is selectable by a user by individual word, (2) an interactive video section, the interactive video section including a video player that plays videos that are synchronized with the synchronized script dialog in the interactive script section, and (3) an interactive shot section, the interactive shot section including selectable vertical line segments, on-screen actor information, shot set-up information, and take numbers; and
    enabling viewing of a production video file on the display device simultaneously with a synchronized script dialog and associated production time codes, scene details, on-screen actor information, camera information, shot set-up information, take number, and combinations thereof.

21. A script synchronization interface system for synchronizing a script, shot properties, and one or more video files by mapping associated metadata, the script synchronization interface system comprising:

one or more processors; and a memory device storing a set of instructions that when executed by the one or more processors, causes the one or more processors to:

access a digital source script that has been synchronized with production video files by using scene number, take, and camera information in both script metadata and video metadata to synchronize takes in the digital source script with takes in the production video files, as well as align dialogue elements from the script metadata with audio from the production video files to create a temporal mapping of exact dialogue start points and end points;

present an interactive script section on a display device that includes synchronized script dialog that is selectable by individual word, wherein a selected word in the synchronized script dialog within the interactive script section is linked to a video frame and a combination of shot set-up and take information associated with the selected word in the script dialog;

present an interactive video section on the display device that includes a video player that plays a synchronized video, wherein the synchronized video in the interactive video section is linked to synchronized script dialog in the interactive script section and a combination of shot set-up and take information associated with the selected word in the script dialog; and present an interactive shot section on the display device that includes selectable vertical line segments, scene details, on-screen actor information, camera information, shot set-up information, and take numbers;

wherein the meta-data used to associate the script with the video files includes production time codes, scene details, on-screen actor information, camera information, shot set-up information, take number, and combinations thereof.

22. The system of claim 21, further including a video file list section, wherein selecting a video file from the video file list section launches the synchronized video in the interactive video section, displays synchronized script dialog in the interactive script section, and displays associated vertical line segments, scene details, on-screen actor information, camera information, shot set-up information, and take number in the interactive shot section.

23. The system of claim 21, wherein the system contextualizes video files by enabling a user to search video files by actor, type of shot, camera set-up, or line of dialog.

24. The system of claim 21, wherein the system transforms the synchronized script dialog into a navigation tool for the video files.

25. The system of claim 21, wherein selecting a shot set-up in the interactive shot section displays a pop-up window listing available takes that are associated with the selected shot set-up.

26. The system of claim 25, wherein selecting a take from the pop-up window of available takes in the interactive shot section launches a corresponding synchronized video in the interactive video section.

27. The system of claim 21, wherein selecting a word in the synchronized script dialog within the interactive script section displays a pop-up window listing available shot set-ups and takes that are associated with the available shot set-ups and corresponding word in the synchronized script dialog.

28. The system of claim 27, wherein selecting a take from the pop-up window of available shot set-ups and takes in the interactive script section launches the synchronized video in the interactive video section.

29. The system of claim 21, wherein selecting a word in the synchronized script dialog within the interactive script section results in a synchronized video displayed within the interactive Video Feed section navigating to a corresponding location in the synchronized video.

30. The system of claim 21, wherein selecting a point on a shot vertical line segment within the interactive script section that corresponds to a specific production timecode results in the synchronized video displayed within the interactive Video Feed section navigating to a specific production timecode location in the synchronized video.

31. The system of claim 21, wherein as a synchronized video plays in the interactive video section, a corresponding section of synchronized script dialog within the interactive script section is highlighted to enable a user to follow along in the synchronized script dialog as the synchronized video plays in the interactive video section.

32. The system of claim 21, wherein as the synchronized video plays in the interactive video section, a navigation bar associated with the synchronized video is selectable to navigate to a production timecode location in the synchronized video, which results in highlighting a corresponding location in the synchronized script dialog within the interactive script section.

33. The system of claim 21, wherein the system performs temporal mapping between a script text file and corresponding timecodes of the video files by building relationships between script text metadata and metadata of the video files and their associated audio information.

34. The method of claim 21, further comprising: identifying lines of dialogue within a video file using voice recognition-based transcription to map the dialogue to a timeline with the video file.

35. The method of claim 21, further comprising: placing comments within a comments dialog box on a video timeline in the script synchronization interface.

36. The method of claim 21, further comprising: mapping comments that are placed on a video file to the script file, wherein the mapped comments are exportable as a lined script document with annotations inline.

37. A script synchronization interface system for synchronizing a script, shot properties, and one or more video files by mapping associated metadata, the script synchronization interface system comprising:

accessing a digital source script that has been synchronized with production video files by using scene number, take, and camera information in both script metadata and video metadata to synchronize takes in the digital source script with takes in the production video files, as well as align dialogue elements from the script metadata with audio from the production video files to create a temporal mapping of exact dialogue start points and end points;

presenting an interactive script section on a display device that includes synchronized script dialog that is selectable by individual word, wherein a selected word in the synchronized script dialog within the interactive script section is linked to a video frame and a combination of shot set-up and take information associated with the selected word in the script dialog;

presenting an interactive video section on the display device that includes a video player that plays a synchronized video, wherein the synchronized video in the interactive video section is linked to synchronized script dialog in the interactive script section and a combination of shot set-up and take information associated with the selected word in the script dialog; and
presenting an interactive shot section on the display device that includes selectable vertical line segments, on-screen actor information, shot set-up information, and take numbers.

\* \* \* \* \*